United States Patent
Nemoto et al.

(10) Patent No.: US 8,435,027 B2
(45) Date of Patent: May 7, 2013

(54) PREFORM MOLDING APPARATUS FOR FORMING A PREFORM HAVING A NECK RING

(75) Inventors: Satoru Nemoto, Yokohama (JP); Masayuki Sasaki, Yokohama (JP); Tsuneo Imatani, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 418 days.

(21) Appl. No.: 12/733,439

(22) PCT Filed: Aug. 27, 2008

(86) PCT No.: PCT/JP2008/065236
§ 371 (c)(1), (2), (4) Date: Mar. 2, 2010

(87) PCT Pub. No.: WO2009/034835
PCT Pub. Date: Mar. 19, 2009

(65) Prior Publication Data
US 2010/0243597 A1 Sep. 30, 2010

(30) Foreign Application Priority Data
Sep. 11, 2007 (JP) .................................. 2007-235674

(51) Int. Cl.
*B29C 45/37* (2006.01)
(52) U.S. Cl.
USPC ........ 425/525; 264/328.7; 425/528; 425/533; 425/555; 425/574

(58) Field of Classification Search .................. 425/525, 425/528, 533, 555, 574; 264/328.7
See application file for complete search history.

(56) References Cited

U.S. PATENT DOCUMENTS

| | | | | |
|---|---|---|---|---|
| 4,534,930 A * | 8/1985 | Nohara | .......................... | 264/513 |
| 6,349,838 B1 * | 2/2002 | Saito et al. | ..................... | 215/371 |
| 7,939,009 B2 * | 5/2011 | Balboni et al. | ................ | 264/523 |
| 2002/0088767 A1 | 7/2002 | Saito et al. | | |
| 2012/0242005 A1 * | 9/2012 | Clarke | ....................... | 264/328.7 |

FOREIGN PATENT DOCUMENTS

| | | |
|---|---|---|
| JP | H10-337769 | 12/1998 |
| JP | 2003-159739 | 6/2003 |
| JP | 2004-268486 | 9/2004 |

OTHER PUBLICATIONS

Machine Translation of Japanese Patent 2004-268486.*

* cited by examiner

*Primary Examiner* — Tim Heitbrink
(74) *Attorney, Agent, or Firm* — Manabu Kanesaka

(57) ABSTRACT

To provide a preform, a bottle and a preform molding apparatus capable of preventing lowering in the mechanical strength of a preform, reducing the amount of a resin material, as well as improving productivity.

A preform mold 1*e* used in the preform molding apparatus has a mouth neck part mold 2, a body part mold 3*e* and a core mold 163, and the body part mold 3*e* has, on the outer edge of the upper surface of a cylindrical protrusion part 31*e*, an annular protrusion 33 which controls the moving direction of a solidified film 118 and a solidified film 117 which have been peeled.

6 Claims, 13 Drawing Sheets

(a)

(b)

319:Convex part

Radial direction   Circumferential direction ated Sep. 11, 2007, the disclosure of which is hereby incorporated by reference herein in its entirety.

PREFORM MOLDING APPARATUS FOR FORMING A PREFORM HAVING A NECK RING

RELATED APPLICATIONS

The present application is based on international Appliation No. PCT/JP2008/065236, filed Aug. 27, 2008, and claims priority from, Japanese Application Number 2007-235674, filed Sep. 11, 2007, the disclosure of which is hereby incorporated by reference herein in its entirety.

TECHNICAL FIELD

The present invention relates to a preform molding apparatus.

A plastic container such as a pet bottle has heretofore been rapidly come into use as a container for a refreshing beverage or the like.

The above-mentioned plastic container is produced mainly by a preform molding process and a blow molding process. In the preform molding process, a preform is produced by the injection molding method or the compression molding process. In the blow molding process, a plastic container is produced from a preform by a blow molding method. The blow molding process is a process in which a fluid is blown to a preform accommodated within a blow mold to cause the preform to expand, whereby a plastic container is molded.

The material for the above-mentioned preform is a synthetic resin such as polyethylene terephthalate. For example, a preform 110 shown in FIG. 9 is provided with a mouth neck part 111, a neck ring 115 and a body part 112. The mouth neck part 111 has a thread 113 and a lid-locking ring 114. Generally, the neck ring 115 is included in the mouth neck part 111. However, in the specification of the present invention, the mouth neck part 111 is positioned above the lower surface of the neck ring 115 and the body part 112 is positioned below the lower surface of the neck ring 115.

In the above-mentioned compression molding method, a preform molding apparatus is normally used. For example, a preform molding apparatus 100 shown in FIG. 10 is provided with an extruder 101, a gear pump 102, a cutter wheel 103, a compression molding machine 104, a take-out wheel 105 or the like. The compression molding machine 104 is provided with a lot of preform molds 106.

Various technologies have been developed on the above-mentioned preform or the preform molding apparatus aiming at the improvement of productivity or quality.

For example, a preform mold disclosed in Patent Document 1 has a driving mold (mouth neck part mold), a cavity mold (body part mold) and a core mold (core part). The driving mold molds the outer surface of the mouth neck part, the upper surface, the outer peripheral surface and the lower surface on the outer peripheral side of the neck ring. The cavity mold molds the lower surface of the inner peripheral side of the neck ring and the outer surface of the body part. The core mold molds the upper surface of the mouth neck part and the inner surface of the preform.

Patent Document 2 discloses a technology of a preform in which an annular groove is formed on the inner peripheral side of the lower surface of a support ring (neck ring).

Patent Document 3 discloses a technology of a preform improved in strength of a thick part (neck ring) by preventing formation of wrinkles or grooves in the above-mentioned annular groove.

A molten resin material gradually starts to solidify at the surface where the material contacts a low-temperature preform mold. At this time, a solidified film is formed, and the resin material inside the solidified film is molten. Due to the inward growth of this solidified film, solidification of the resin material progresses. When the molten resin material is solidified, the volume thereof is decreased by shrinkage.

In order to absorb this amount of shrinkage to mold the preform 110 in a prescribed shape, as shown in FIG. 11, a mouth neck part mold 161 and a body part mold 162 of the preform mold 106 move in a minor distance of Δ so that they relatively approach.

The mouth neck part mold 161 has a sliding surface 1611 on the inner surface of a lower opening. The body part mold 162 has a cylindrical protrusion part 1621 which is engaged in the above-mentioned opening. Further, on the outer surface of the cylindrical projection 1621, it has a sliding surface 1622 which slides against the sliding surface 1611. Due to such a configuration, the molten resin 116 is sealed within the preform mold 106, and the body part mold 162 moves upward in a distance of Δ according to the amount of shrinkage of the resin material.

Due to this move of the mold, the molten resin material inside the solidified film moves. Therefore, the preform is molded in a shape corresponding to the preform mold with a high degree of accuracy.

Patent Document 1: JP-A-2003-159739
Patent Document 2: JP-A-H10-337769
Patent Document 3: JP-A-2004-268486

DISCLOSURE OF THE INVENTION

Problems to be Solved by the Invention

As mentioned above, the molten resin 116 starts to solidify on the surface where it contacts the low-temperature preform mold 106, and as shown in FIG. 12a, a solidified film 117 (+marks indicated by a solid line) is formed. This solidified film 117 is also formed on the sliding surface 1611 on the mouth neck part mold 161 which is in contact with the molten resin 116. As the solidification progresses, the molten resin 116 undergoes shrinkage. In order to absorb this amount of shrinkage, the body part mold 162 (cylindrical protrusion part 1621) moves upwardly in a distance of Δ according to the amount of shrinkage of the resin material. In an enlarged view such as FIG. 12a, hatching of the molten resin 116 is omitted.

When the cylindrical protrusion part 1621 moves upwardly, as shown in FIG. 12b, for example, the solidified film 117 formed on the sliding surface 1611 is pushed into the neck ring 115. The solidified film 117 formed on the surface which is in contact with the preform mold 106 is further solidified. Part of the (soft) solidified film 117 becomes a (hard) solidified film 117' (+marks indicated by a thick line). Inside the solidified film 117 and the solidified film 117', a new (soft) solidified film 118 (+marks indicated by a dotted line) is partially formed. This solidified film 118 is also formed on the sliding surface 1611 of the mouth neck part mold 161 which is in contact with the molten resin 116.

As the solidification further progresses, the cylindrical protrusion part 1621 moves further upwardly. Then, for example, as shown in FIG. 12c, the solidified film 117' or the solidified film 118 formed on the sliding surface 1611 is pushed into the neck ring 115. At this time, according to the cooling rate of the molten resin 116, the temperature distribution of each part of the preform mold 106, conditions (solidification and shrinkage conditions) such as the timing or rate of moving of the cylindrical protrusion part 1621, the solidified film 117' or the solidified film 118 is pushed into the neck ring 115 in various conditions. In this case, as shown in FIG. 12c, the solidified film 117' intrudes into the molten resin 116 almost upwardly (in a direction indicated by an arrow). Formation of a boundary surface 119 (dotted thick line) between this solidified film 117' and the molten resin 116 with a poor mechanical strength is required to be prevented. Therefore, by increasing the thickness of the neck ring 115 and by decreasing the solidification/shrinkage speed of the resin, a prescribed mechanical strength required for the neck ring 115 is satisfied.

In recent years, in producing a plastic container such as a pet bottle, development of a technology of reducing a resin material or improving productivity has been required.

The present invention has been made in view of these requirements, and the object thereof is to provide a preform, a bottle and a preform molding apparatus capable of preventing lowering of the mechanical strength of a preform, reducing the amount of a resin material and improving the productivity.

Means for Solving the Problem

In order to attain the object, the preform of the present invention is a preform which is molded by means of a mold and has a neck ring. In the preform of the present invention, a solidified film formed when a molten resin material is solidified and shrunk is gathered in a predetermined region of the neck ring.

Here, the term "the solidified film is gathered" is generally referred to as stacking (laminating) solidified films and rolling or folding solidified films.

It is preferred that the predetermined region in the neck ring be at least one region of the upper, lower and side parts of the neck ring. Further, it is preferred that the predetermined region in the neck ring be at least one region of the upper part of the outer peripheral side, the lower part of the outer peripheral side and the side part of the neck ring.

The present invention is also effective as an invention of a bottle.

The bottle of the present invention is a bottle which is molded by subjecting the above-mentioned preform to blow molding.

The present invention is also effective as an invention of a preform molding apparatus.

The preform molding apparatus of the present invention is a preform molding apparatus which molds a preform which has neck ring, a mouth neck part and a body part by means of a preform mold. In this preform molding apparatus, the preform molding apparatus is provided with a mouth neck part mold which molds the outer surface of the mouth neck part and the upper part of the above-mentioned neck ring, a body part mold which molds the outer surface of the body part and the lower surface of the neck ring and a core mold which molds the inner surface of the preform. Further, the mouth neck part mold and the body part mold each have a sliding surface at a position corresponding to the outer diameter of the neck ring, whereby the mouth neck part mold and the body part mold relatively approach while sliding at the sliding surface according to the amount of shrinkage of the resin material to mold the neck ring when the molten resin material is solidified and shrunk.

In this case, it is preferred that, at least one of the mouth neck part mold and the body part mold have an outer surface constituting part of the sliding surface and an inner surface having a protrusion which contains at least one of an inclined surface and a curved surface.

Further, it is preferred that at least one of the mouth neck part mold and the body part mold have at least one of a step, a concave part and a convex part at a position corresponding to the neck ring.

According to the preform, the bottle and the preform molding apparatus of the present invention, it is possible to prevent lowering of the mechanical strength of the preform, to reduce the amount of a resin material and to improve productivity.

BEST MODE FOR CARRYING OUT THE INVENTION

[First Embodiment of the Preform Molding Apparatus and the Preform]

Figure 10:
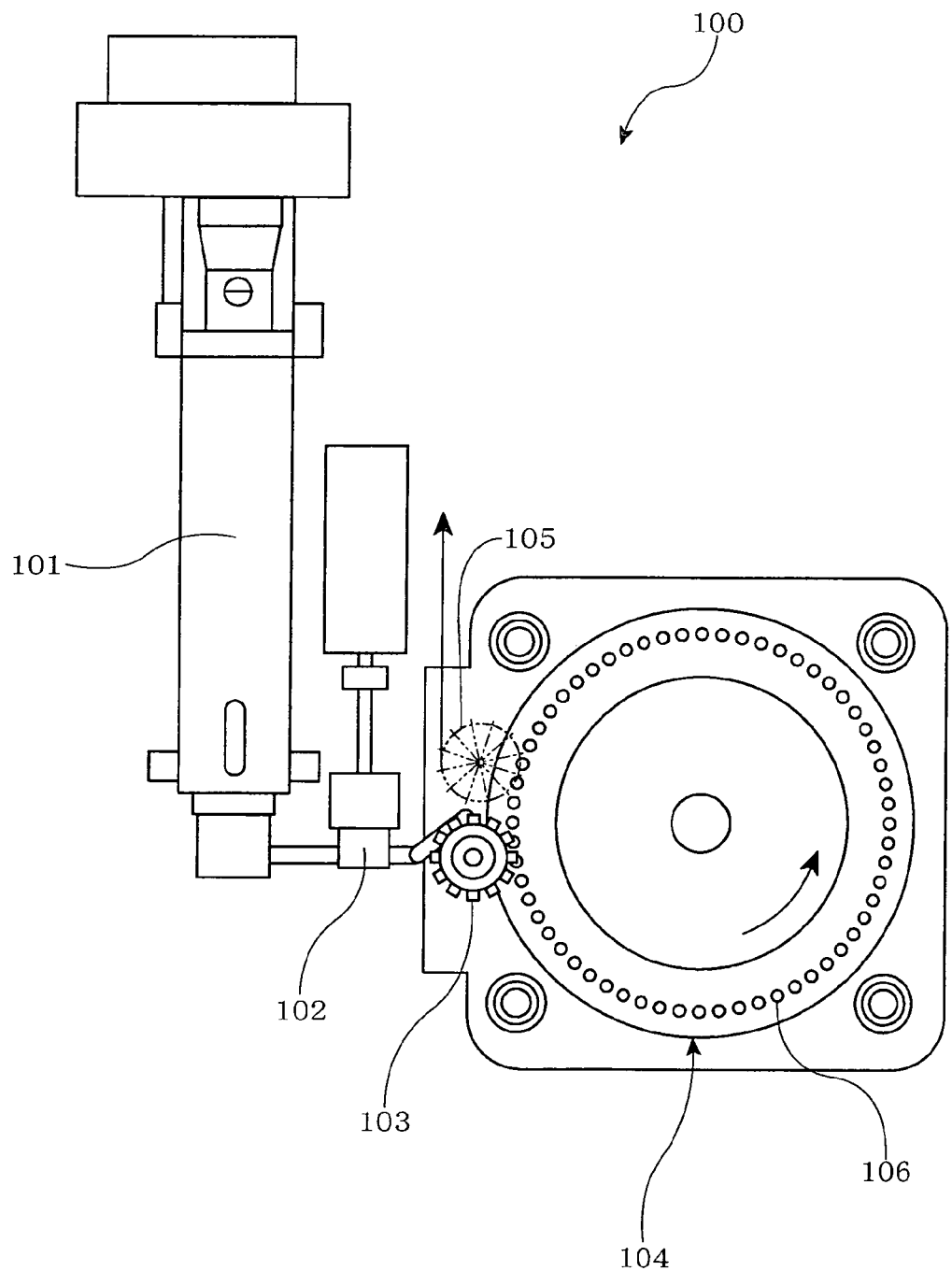
FIG. 10 is a schematic plan view of the preform molding apparatus relating to the present invention.

The preform molding apparatus according to the first embodiment of the present invention differs from the preform molding apparatus 100 shown in FIG. 10 in the preform mold 106 provided in a compression molding machine 104. Other constituting elements are almost similar to those of the preform molding apparatus 100.

Figure 1:
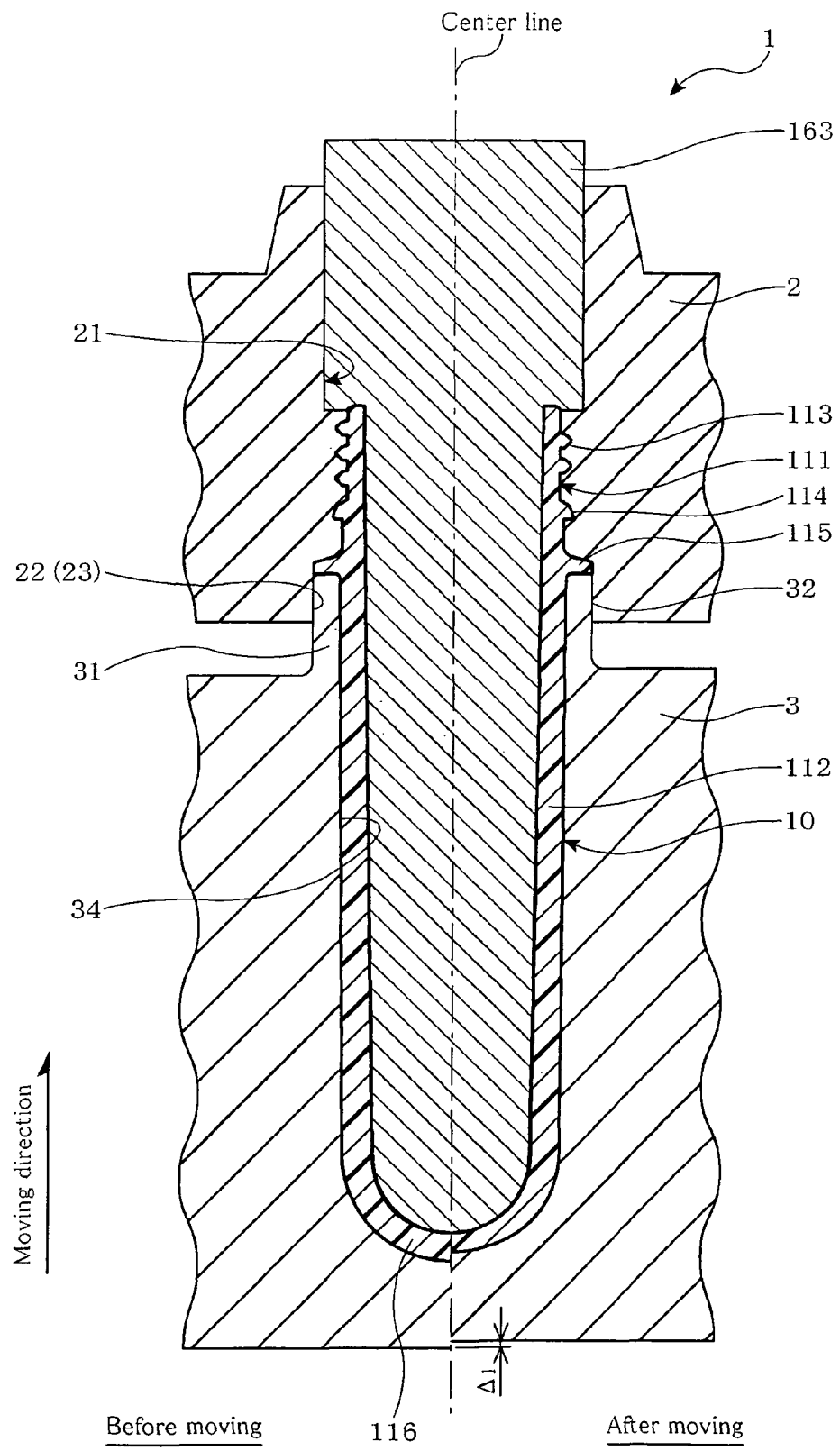
FIG. 1 is a schematic cross-sectional view for explaining a preform mold used in the preform molding apparatus according to the first embodiment of the present invention.
Figure 11:
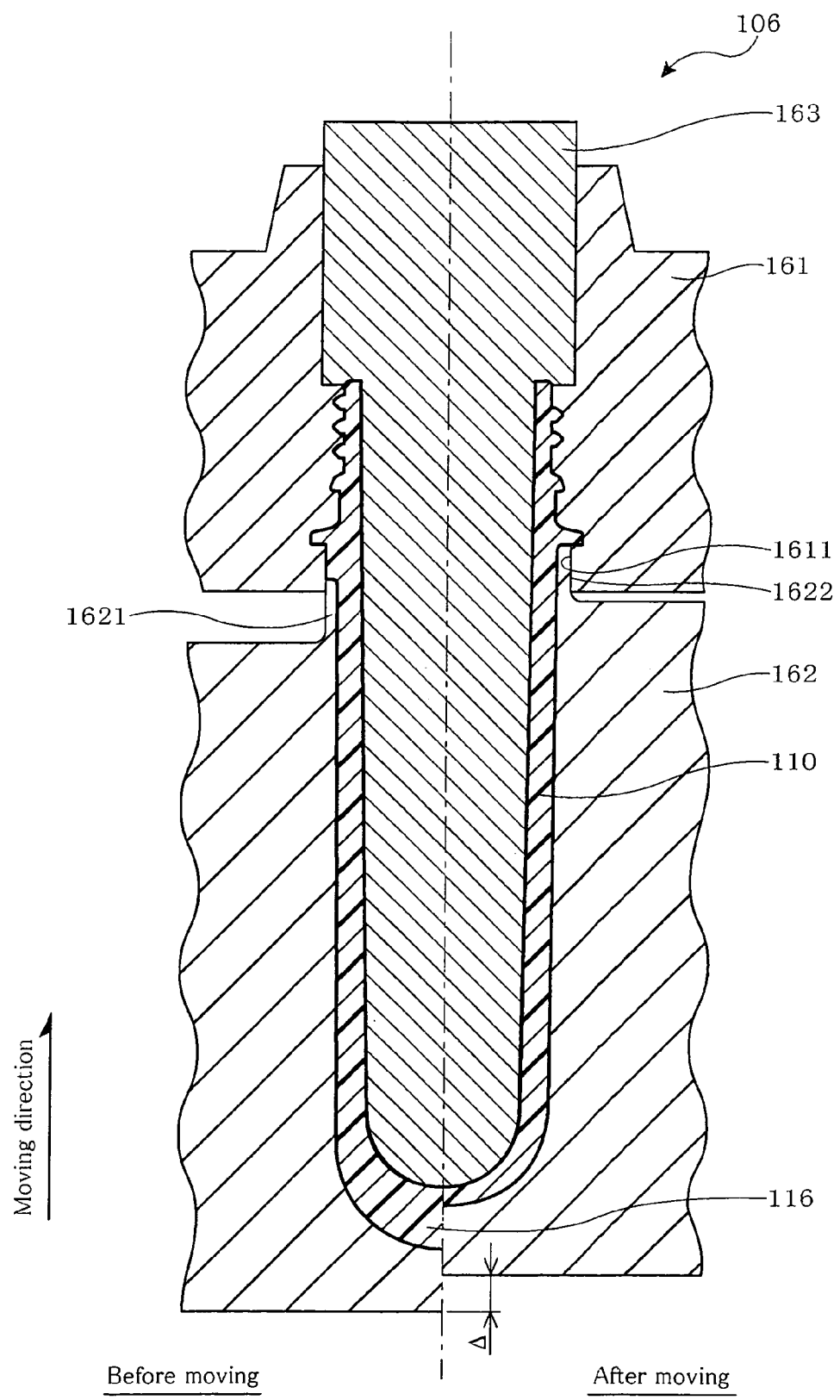
FIG. 11 is a schematic cross-sectional view for explaining the preform mold relating to the present invention.

Therefore, in FIG. 1, the same symbols are used to indicate the same constituting elements shown in FIG. 11, and a detailed explanation is omitted.

FIG. 1 is a schematic cross-sectional view for explaining a preform mold used in the preform molding apparatus according to the first embodiment of the present invention.

In FIG. 1, a preform mold 1 is provided with a mouth neck part mold 2, a body part mold 3 and a core mold 163.

A preform 10 molded by the preform mold 1 has substantially the same shape and size as those of the above-mentioned preform 110.

The mouth neck part mold 2 is a split mold which is divided into two by a virtual surface including the center line of the preform 10. In the mouth neck part mold 2, an opening part 21 into which the core mold 163 is inserted is formed. This opening part 21 has such a shape that allows molding of the outer surface of the cylindrical part of the mouth neck part 111, the thread 113, the lid-locking ring 114, the upper surface of the neck ring 115 and the outer peripheral surface of the neck ring 115. Further, in this opening part 21, the lower part of the neck ring 115 is a circular hole 22. The diameter of the circular hole 22 is the outer diameter of the neck ring 115. The inner surface of this circular hole 22 is a sliding surface 23.

The neck ring 115 of this embodiment has an annular shape. However, if the outer shape of the neck ring 115 is polygonal, the opening part below the neck ring 115 is a hole having a shape corresponding to this polygon.

In a body part mold 3, an opening part 34 into which the core mold 163 is inserted is formed, and, around this opening part 34, a substantially cylindrical protrusion part 31 is formed. The outer surface of the body part 112 is formed by the inner surface of this opening part 34 and the inner surface of the cylindrical protrusion part 31. The lower surface of the neck ring 115 is formed by the upper surface of the cylindrical protrusion part 31. The outer diameter of the cylindrical protrusion part 31 is a diameter which allows insertion into the circular hole of the mouth neck part mold 2. The outer peripheral surface of the cylindrical protrusion part 31 is a sliding surface 32. This sliding surface 32 slides against a sliding surface 23 to cause the molten resin 116 to be sealed.

The core mold in this embodiment has a configuration which is substantially the same as that of the core mold 163 shown in FIG. 11.

Next, an explanation is made with reference to the drawings on the operation of the preform mold 1 with the above-mentioned configuration and the preform 10 produced by the preform mold 1.

Figure 2:
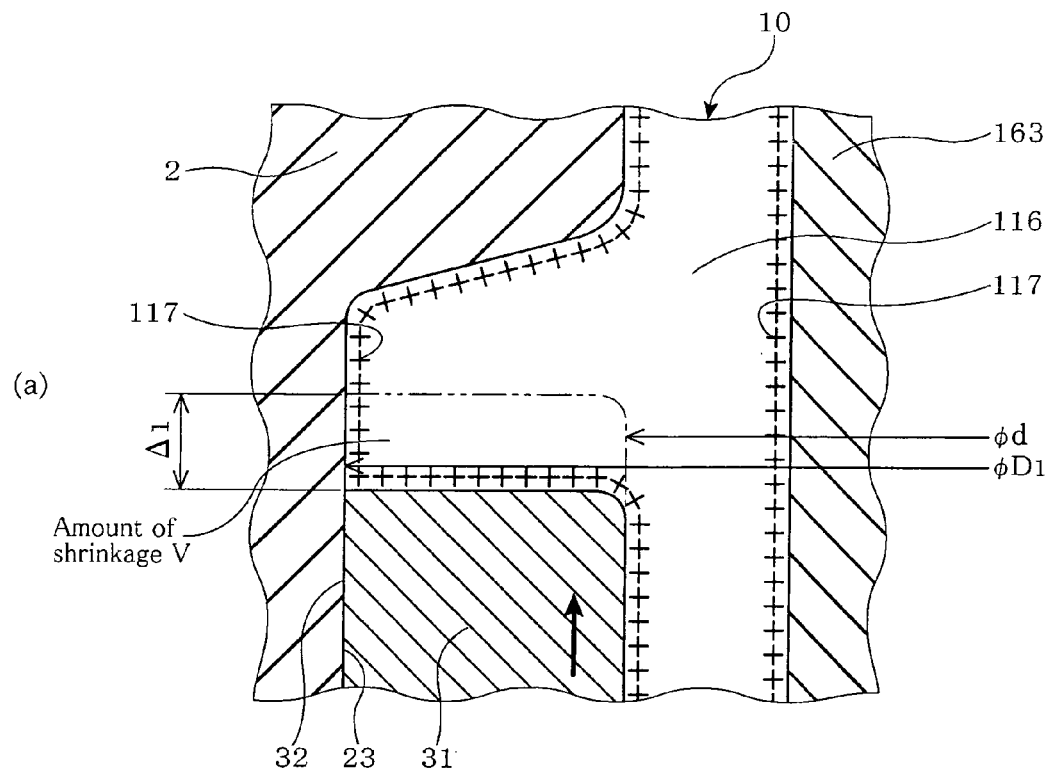
FIG. 2 is a schematic enlarged view of essential parts for explaining the state of solidification of the preform according to the first embodiment of the present invention, in which (a) is a cross-sectional view showing the state when solidification starts; and (b) is a cross-sectional view showing the state when solidification is almost complete.
Figure 2:
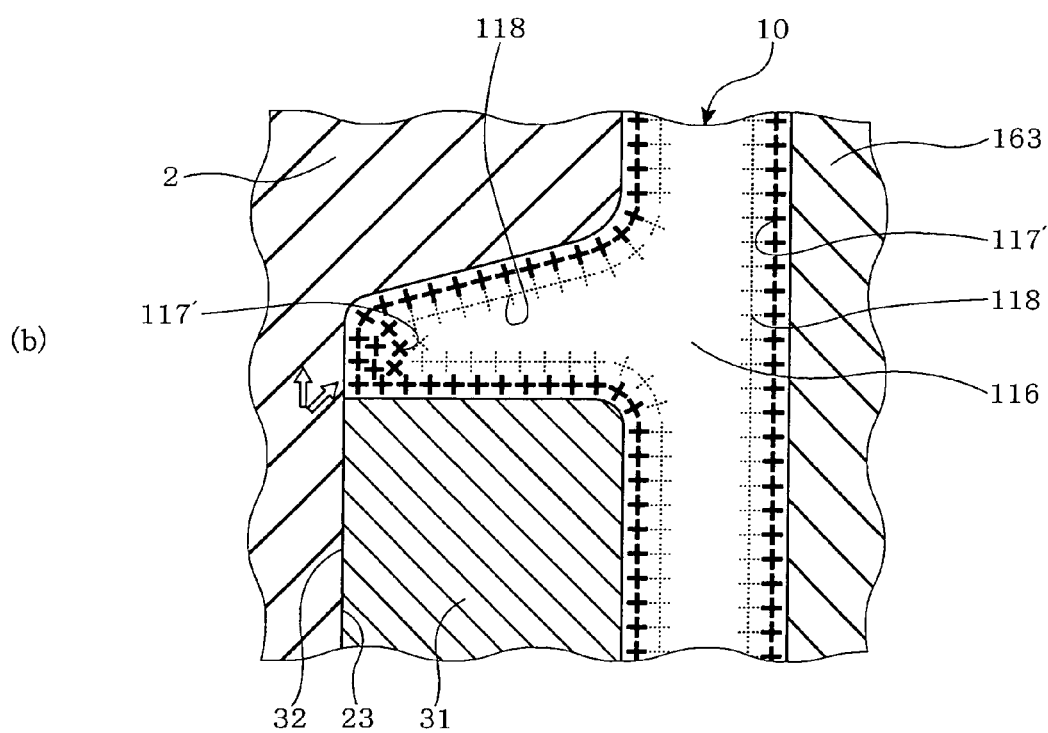

FIG. 2 is a schematic enlarged view of essential parts for explaining the state of solidification of the preform according to the first embodiment of the present invention, in which (a) is a cross-sectional view showing the state when solidification starts; and (b) is a cross-sectional view showing the state when solidification is almost complete.

As shown in FIG. 2(a), the molten resin 116 starts to solidify on the surface where it contacts the low-temperature molding mold 1, whereby a solidified film 117 (+marks indicated by a solid line) is formed.

Figure 12A:
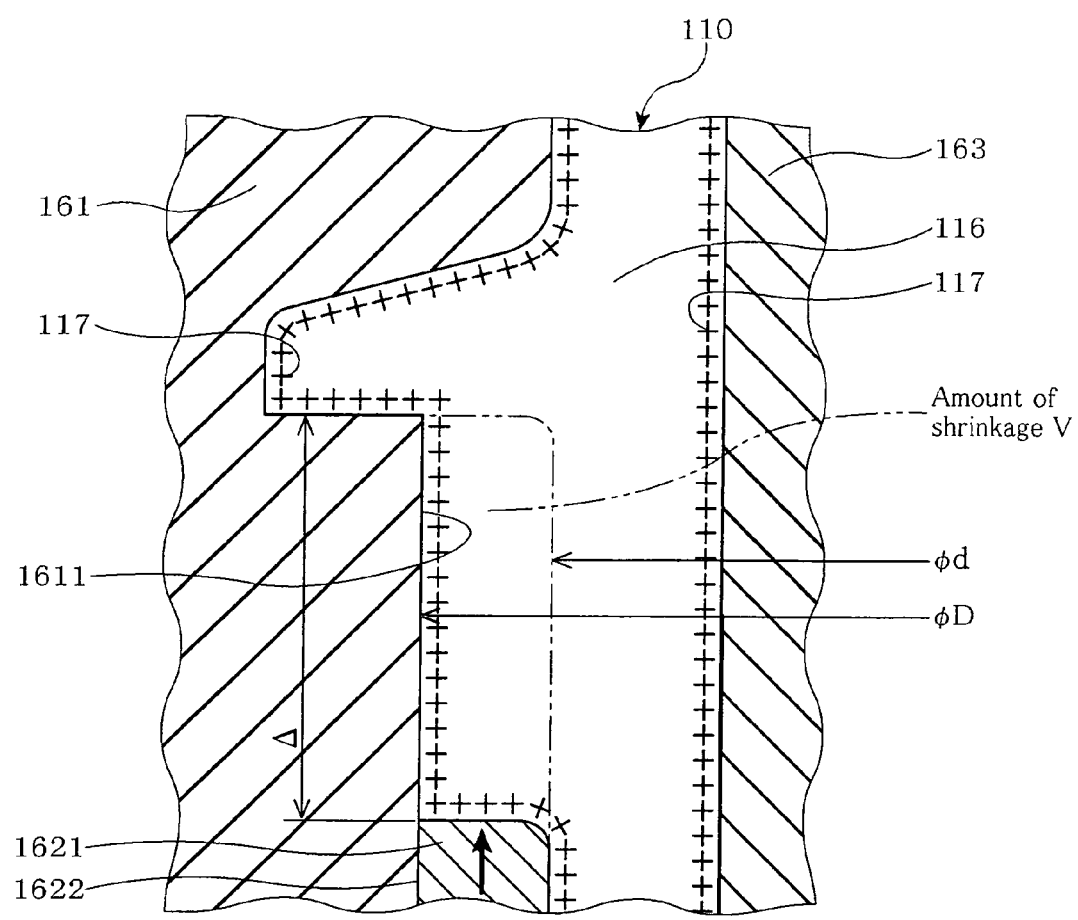
FIG. 12a is a schematic enlarged cross-sectional view for explaining the state when solidification of the preform relating to the present invention starts.
Figure 12B:
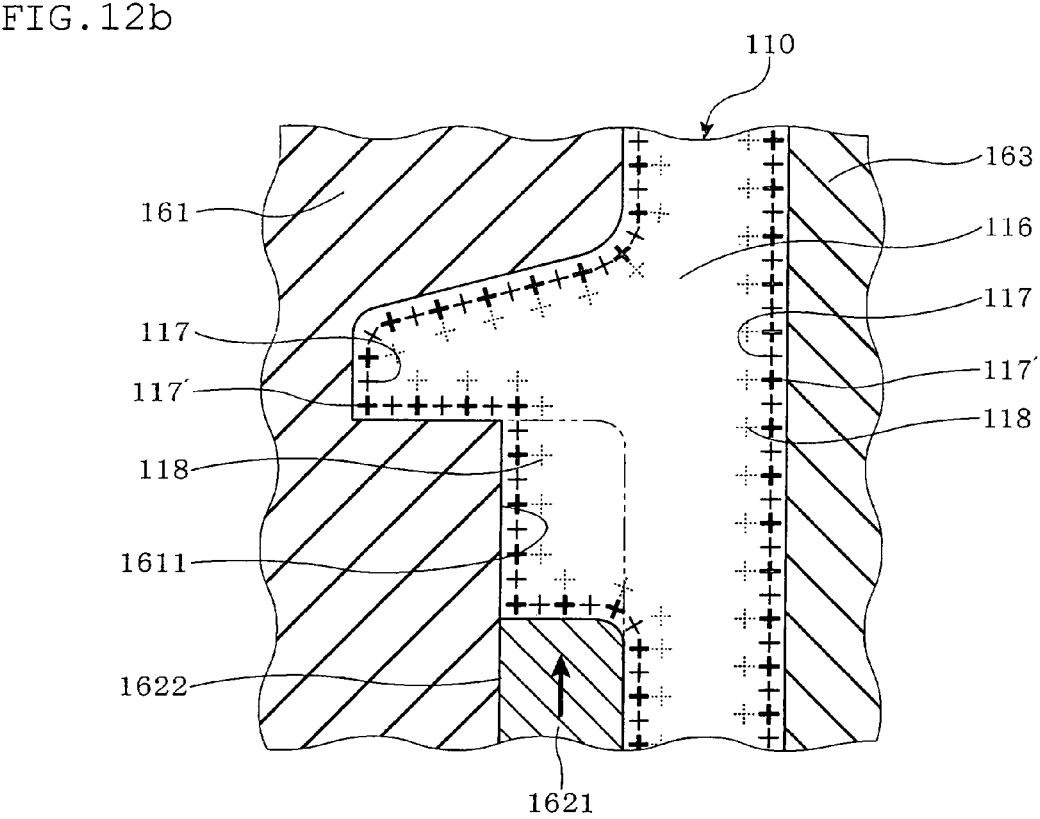
FIG. 12b is a schematic enlarged cross-sectional view for explaining the state when solidification of the preform relating to the present invention progresses.
Figure 12C:
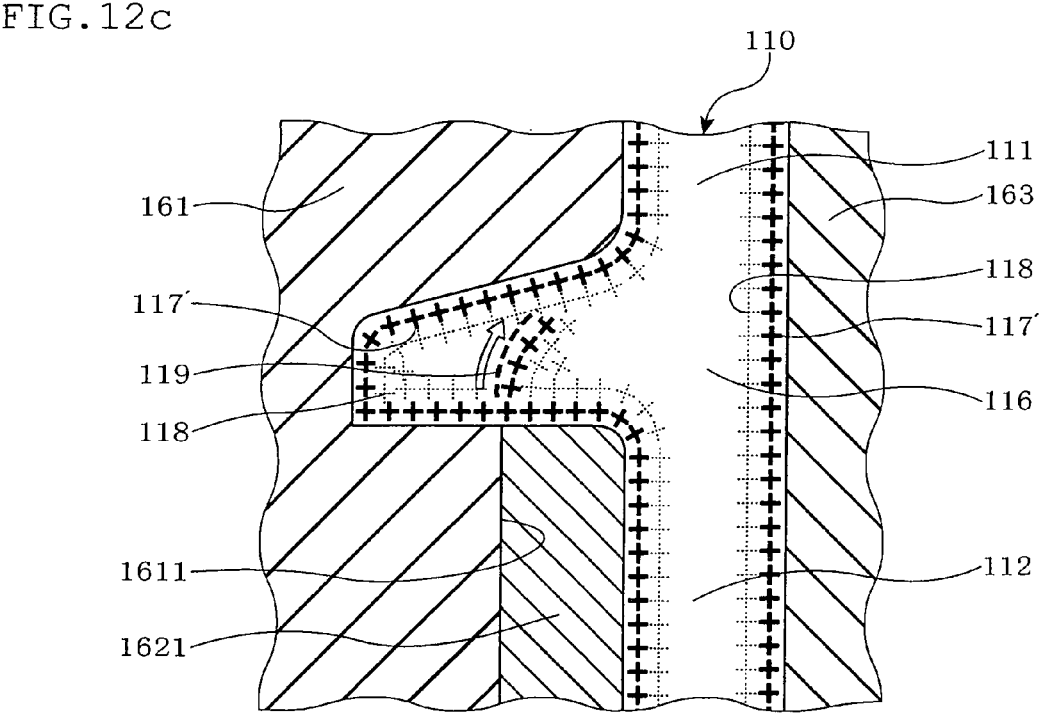
FIG. 12c is a schematic enlarged cross-sectional view of essential parts for explaining the state when solidification of the preform relating to the present invention is complete.

The preform 10 of this embodiment has the same shape and size as those of the preform 110 shown in FIG. 12c. Therefore, the amount of shrinkage V of the preform 10 and the amount of shrinkage V of the preform 110 are the same. The moving distance $\Delta$ shown in FIG. 12a is expressed as $\Delta=4V/(\pi D^2-\pi d^2)$ when the outer diameter and the inner diameter of the cylindrical protrusion part 1621 are taken as D and d, respectively. The moving distance $\Delta_1$ shown in FIG. 2 is expressed as $\Delta_1=4V/(\pi D_1^2-\pi d^2)$ when the outer diameter and the inner diameter of the cylindrical protrusion part 31 are taken as $D_1$ and d, respectively. Since $D_1$ is larger than D, the moving distance $\Delta_1$ of this embodiment is normally a fraction of the moving distance $\Delta$ shown in FIG. 12a.

Further, on the sliding surface 1611 shown in FIG. 12a, an excessive solidified film 117 is formed, the surface area of which is expressed as $\pi D \times \Delta$. As shown in FIG. 2(a), on the sliding surface 23, the excessive film 117 is formed, of which the surface area is expressed as $\pi D_1 \times \Delta_1$. Normally, the surface area of the excessive solidified film 117 according to this embodiment is a fraction of the surface area of the excessive solidified film 117 generated shown in FIG. 12a. That is, the preform mold 1 and the preform 10 of this embodiment are advantageous since the amount of the excessive solidified film 117 is decreased.

As solidification progresses, as mentioned above, part of the solidified film 117 formed on the surface which contacts the preform mold 1 becomes a (hard) solidified film 117' which is further solidified (+marks indicated by a thick line). Inside the solidified film 117 and the solidified film 117', a new (soft) solidified film 118 (+marks indicated by a dotted line) is partially formed. These solidified films 117' and 118 are also formed on the sliding surface 23 of the mouth neck mold 2 which contacts the molten resin 116. If the above-mentioned solidification progresses, the molten resin shrinks to reduce the volume. Therefore, it is required to absorb the amount of shrinkage. That is, as shown in FIG. 2(b), the body part mold 3 (cylindrical protrusion part 31) moves upwardly in a distance of $\Delta_1$ according to the amount of shrinkage of the resin material.

When the cylindrical protrusion part 31 moves upwardly, the solidified film 117' or the solidified film 118 formed on the sliding surface 23 is pushed into a region where the side surface and the lower surface of the neck ring 115 intersect (to a lower region of the side part (outer peripheral region) of the neck ring 115 (in the direction indicated by arrows in FIG. 2(b)). Then, in a lower region of the side part of the neck ring 115, the solidified film 117' is formed in a mass, and, in the inside thereof, the solidified film 118 (or a further new solidified film) is formed. That is, the solidified film 117' and the solidified 118 are formed in a state that they are gathered in the side part of the neck ring 115.

In this way, a region where the solidified films 117' and 118 are gathered, which are formed on the sliding surface 23, is away from a root or the like of the neck ring 115 (a region which is important for mechanical strength), lowering in mechanical strength of the preform 10 can be prevented without fail.

In this embodiment, the body part mold 3 is caused to move upwardly. The manner of movement is, however, not limited thereto. For example, the mouth neck part mold 2 may be moved downwardly, or the body part mold 3 may be moved upwardly and the mouth neck part mold 2 may be moved downwardly.

In this embodiment, the mouth neck part mold 2 has a circular hole 22 into which the cylindrical protrusion part 31 is engaged, and the body part mold 3 has the cylindrical protrusion part 31. The configuration is, however, not limited thereto. For example, although not shown, the mouth neck part mold may have a cylindrical protrusion part and the body part mold may have a circular hole into which this cylindrical protrusion part is engaged.

As mentioned hereinabove, according to the preform molding apparatus according to this embodiment, the solidified films 117' and 118, which are formed when the molten resin material is solidified and shrunk, can be gathered in the side part of the neck ring 115. That is, intrusion of the solidified films 117' and 118 which are gathered into the molten resin 116, as shown in FIG. 12c, is effectively prevented. Since no boundary surface with a poor mechanical strength is formed between the solidified films 117', 118 and the resin material 116 which will be solidified, lowering in mechanical strength of the preform 10 can be prevented.

In addition, since the mechanical strength is not lowered even when the speed of solidification of the molten resin 116 is increased, productivity can be improved. Further, it is not required to increase the amount of the resin material in order to reinforce a boundary area which has a poor mechanical strength, the amount of the resin material can be decreased. In addition, degrading of appearance due to the presence of the above-mentioned boundary surface (light is reflected by the boundary surface) can be prevented.

As mentioned above, in the preform 10 of this embodiment, the solidified films 117' and 118, which are formed on the sliding surface 23, are gathered in the side part of the neck ring 115. This preform 10 can prevent the above-mentioned lowering of mechanical strength caused by the boundary surface 119. Therefore, productivity can be improved, the amount of the resin material can be decreased, and degrading of appearance due to the presence of the above-mentioned boundary surface (light is reflected by the boundary surface) can be suppressed.

In addition, by conducting blow molding, a bottle (not shown) formed from the preform 10 of this embodiment can have the same effects as those attained by the preform 10.

In the above-mentioned embodiment, the upper surface of the cylindrical protrusion part 31 of the body part mold 3 is almost planar. The configuration is, however, not limited thereto. For example, at least one of a step, a concave part and a convex part may be provided in a position corresponding to the neck ring 115 (a position in the outer peripheral side on the upper surface of the cylindrical protrusion part 31, or the like).

Then, the examples thereof will be explained with reference to the drawings.

FIRST EXAMPLE

Figure 3:
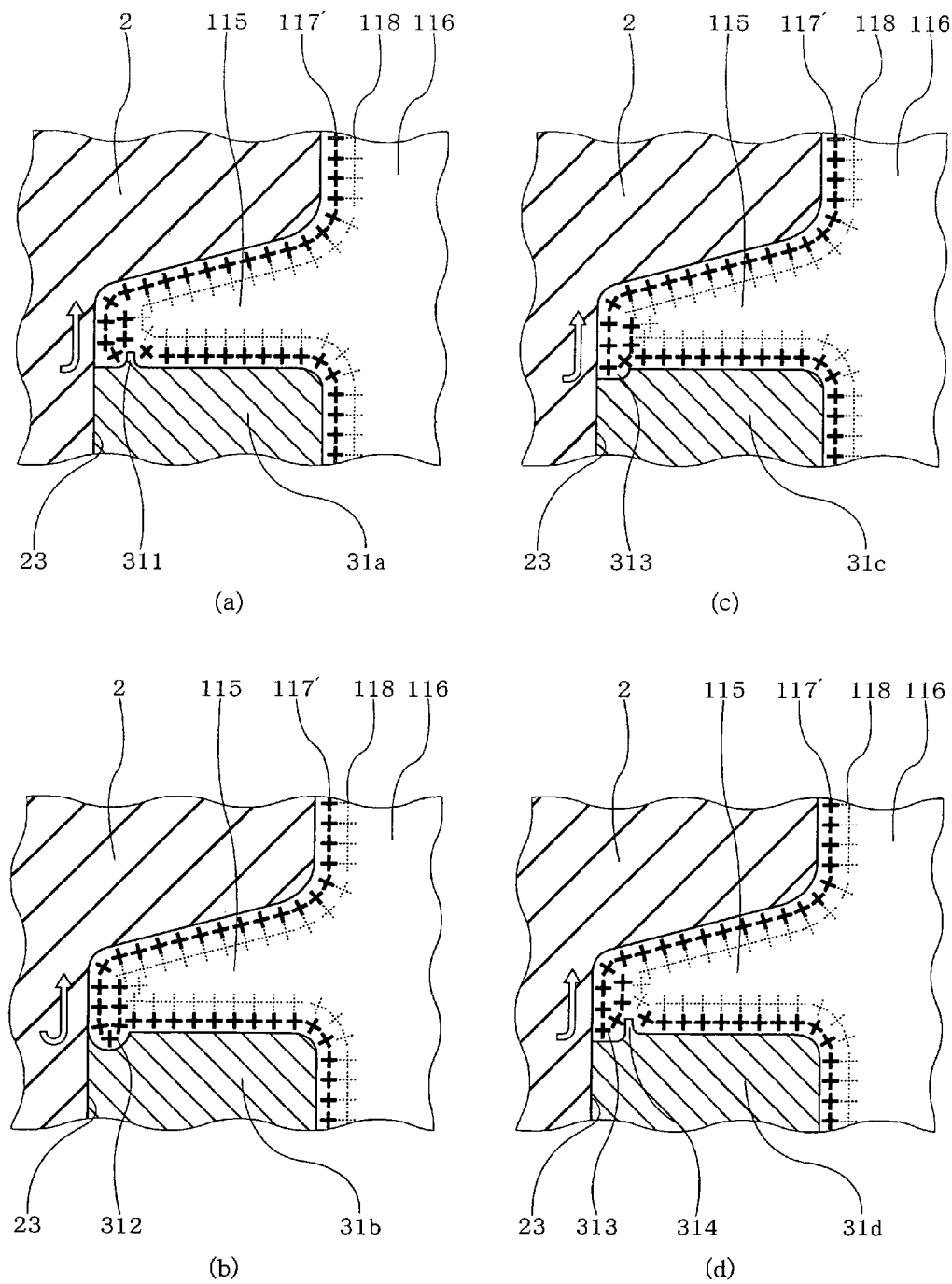
FIG. 3 is a schematic enlarged cross-sectional view of essential parts for explaining the preform mold used in the preform molding apparatus and the solidification state of the preform according to each example of the first embodiment of the present invention.

FIG. 3 is a schematic enlarged cross-sectional view of essential parts for explaining the preform mold used in the preform molding apparatus and the solidification state of the preform according to each example of the first embodiment of the present invention.

A preform mold 1 of First Example shown in FIG. 3(a) has, inside the outer periphery of the upper surface of a cylindrical protrusion part 31a, an annular convex part 311 which protrudes upwardly. The convex part 311 has an inclined surface or curved surface which goes down from the top to the outer peripheral direction.

According to this preform mold 1, the solidified film 117' and the solidified film 118, which are formed on the sliding surface 23 are folded in a region below the side part of a neck ring 115, and pushed upwardly (in the direction indicated by an arrow). That is, the solidified film 117' and the solidified film 118, which are formed on the sliding surface 23, can be gathered without fail in the side part (outer peripheral part) of the neck ring 115.

The preform 10 and the bottle of First Example can avoid a disadvantage that the mechanical strength of the neck ring 115 is lowered. In addition, an annular recess is formed by the convex part 311 on the lower surface of the neck ring 115.

SECOND EXAMPLE

The preform mold 1 of Second Example shown in FIG. 3(b) has an annular concave part 312 in the vicinity of the outer periphery of the upper surface of the cylindrical protrusion part 31b. This concave part 312 has a semi-circular cross section.

According to this preform mold 1, the solidified film 117' and the solidified film 118, which are formed on the sliding surface 23, move along the curved surface of the concave part 312. They are then folded in a region below the side part of the neck ring 115, and pushed upwardly (in a direction indicated by an arrow). That is, the solidified film 117' and the solidified film 118, which are formed on the sliding surface 23, can be gathered without fail in the outer peripheral part of the neck ring 115.

The preform 10 and the bottle of Second Example can avoid a disadvantage that the mechanical strength of the neck ring 115 is lowered. In addition, an annular protrusion part is formed by the concave part 312 on the lower surface of the neck ring 115.

THIRD EXAMPLE

The preform mold 1 of Third Example shown in FIG. 3(c) has an annular step 313 in the vicinity of the outer periphery of the upper surface of the cylindrical protrusion part 31c. This step 313 is formed below the upper surface of the cylindrical protrusion part 31c, and has an inclined surface or a curved surface which descends from the top of the cylindrical protrusion part 31c to the outer peripheral direction.

According to this preform mold 1, the solidified film 117' and the solidified film 118 which are formed on the sliding surface 23 move along the step 313. They are then folded in a region of the side part of a neck ring 115, and pushed upwardly (in a direction indicated by an arrow). That is, the solidified film 117' and the solidified film 118, which are formed on the sliding surface 23, can be gathered without fail in the outer peripheral part of the neck ring 115.

The preform 10 and the bottle of Third Example can avoid a disadvantage that the mechanical strength of the neck ring 115 is lowered. In addition, an annular recess is formed by the step 313 on the lower surface of the neck ring 115.

FOURTH EXAMPLE

The preform mold 1 of Fourth Example shown in FIG. 3(d) has an annular step 313 in the vicinity of the outer periphery of the upper surface of the cylindrical protrusion part 31d, and has an annular convex part 314 inside the step 313. This step 313 is formed lower than the upper surface of the cylindrical protrusion part 31d, and has an inclined surface or a curved surface which goes down from the convex part 314 to the outer peripheral direction. The convex part 314 juts out on the upper surface of the cylindrical protrusion part 31d.

According to this preform mold 1, the solidified film 117' and the solidified film 118, which is formed on the sliding surface 23, moves along the step 313 and the convex part 314. They are then folded in a region below the side part of a neck ring 115, and pushed upwardly (in a direction indicated by an arrow). That is, the solidified film 117' and the solidified film 118, which are formed on the sliding surface 23, can be gathered without fail in the outer peripheral part of the neck ring 115.

The preform 10 and the bottle of Fourth Example can avoid a disadvantage that the mechanical strength of the neck ring 115 is lowered. In addition, on the lower surface of the neck ring 115, a protrusion is formed by the step 313 and an annular recess is formed by the convex part 314.

[Second Embodiment of the Preform Molding Apparatus and the Preform]

The preform molding apparatus according to the second embodiment of the present invention differs from the preform molding apparatus of the above-mentioned first embodiment in the preform mold provided in a compression molding machine 104. Other constituting elements are almost similar to those of the preform molding apparatus in the first embodiment.

Figure 4:
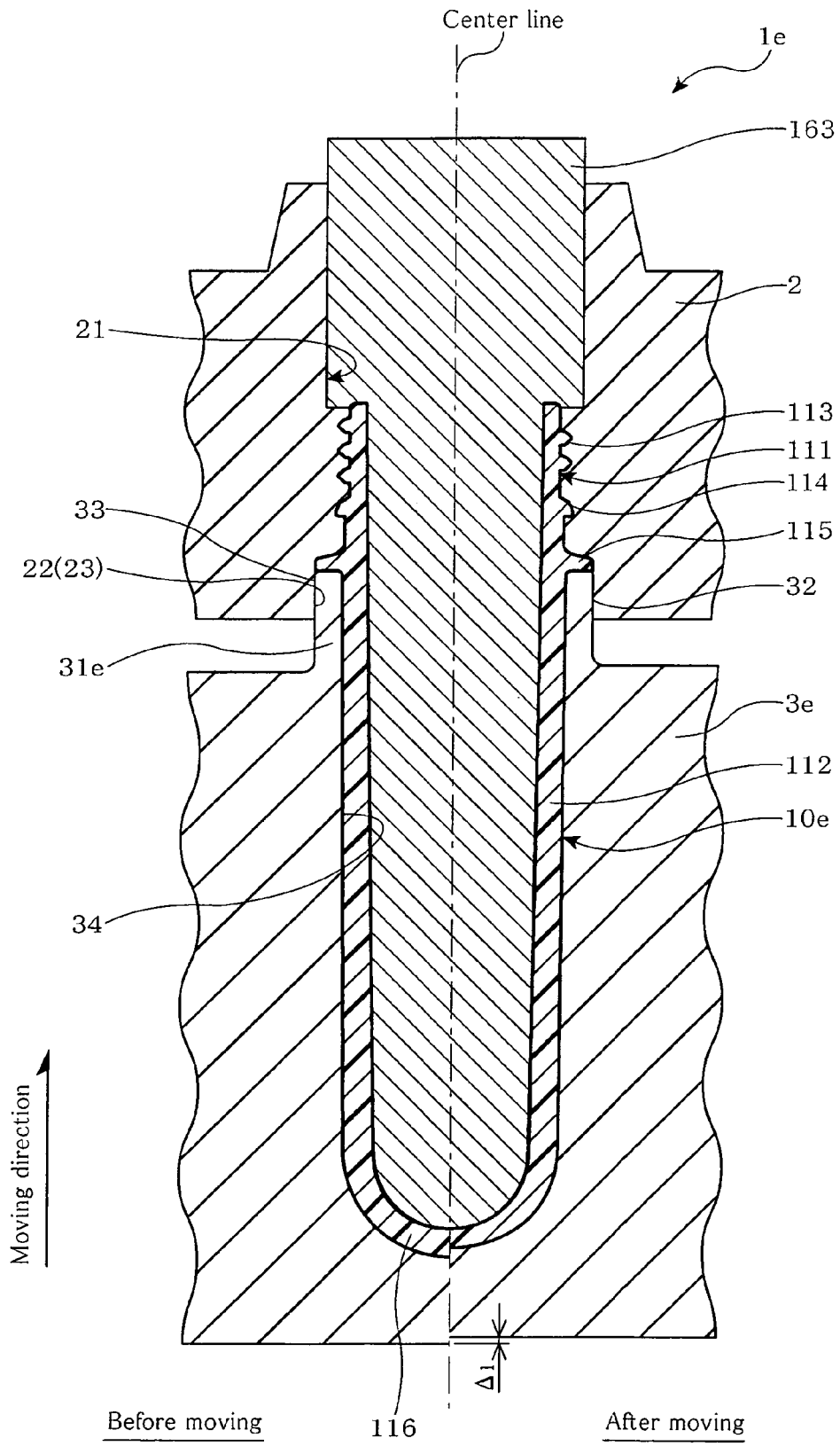
FIG. 4 is a schematic cross-sectional view for explaining the preform mold used in the preform molding apparatus according to the second embodiment of the present invention.

Therefore, in FIG. 4, the same signals are used to indicate the same constituting elements as shown in FIG. 1, and a detailed explanation is omitted.

FIG. 4 is a schematic cross-sectional view for explaining the preform mold used in the preform molding apparatus according to the second embodiment of the present invention.

In FIG. 4, a preform mold 1e is provided with the mouth neck part mold 2, the body part mold 3e and a core mold 163.

The preform 10e molded by the preform mold 1e differs from the above-mentioned preform 10 in that the side surface and the lower surface of the neck ring 115 are beveled to be an arc-shaped curved surface. Other shapes and dimensions are the same.

The body part mold 3e differs from the above-mentioned body part mold 3 in that an annular protrusion 33 is formed on the outer edge of the upper surface of the cylindrical protrusion part 31e.

The outer surface of this protrusion 33 is part of the sliding surface 32, and the inner surface of which is an arc-shaped curved surface which descends inwardly from the top of the protrusion 33. This curved surface smoothly connects with the flat upper surface of the cylindrical protrusion part 31e (see FIG. 5).

The other configurations of the body part mold 3e are almost the same as those of the above-mentioned body part mold 3. The mouth neck part mold and the core mold of this embodiment have substantially the same configuration as those of the mouth neck part 2 and the core mold 163 shown in FIG. 1.

Then, the operation of the preform mold 1e with the above-mentioned configuration and the preform 10e produced by the preform mold 1e will be explained with reference to the drawings.

Figure 5:
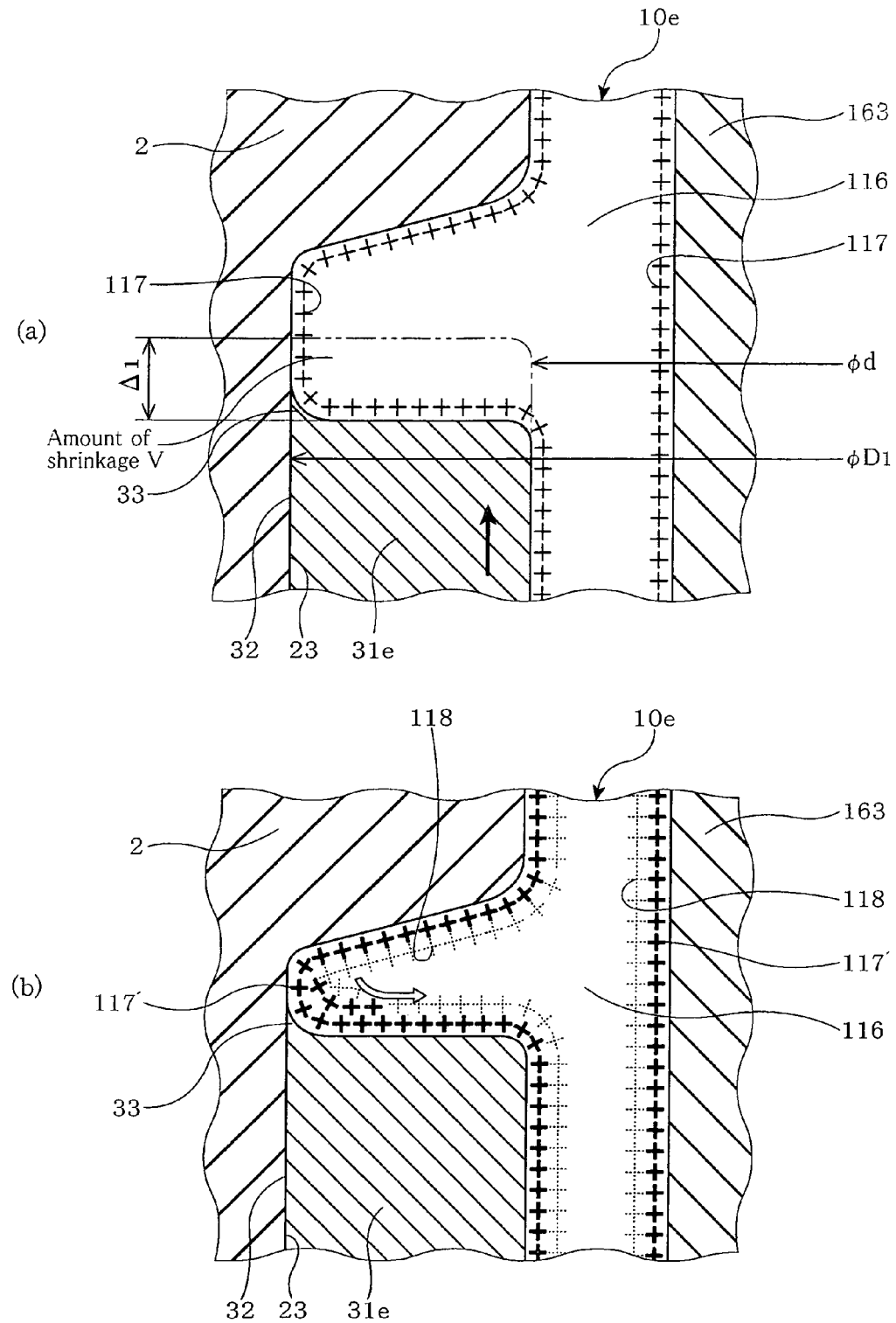
FIG. 5 is a schematic enlarged view of essential parts for explaining the state of solidification of the preform according to the second embodiment of the present invention, in which (a) is a cross-sectional view showing the state when solidification starts; and (b) is a cross-sectional view showing the state when solidification is almost complete.

FIG. 5 is a schematic enlarged view of essential parts for explaining the state of solidification of the preform according to the second embodiment of the present invention, in which (a) is a cross-sectional view showing the state when solidification starts; and (b) is a cross-sectional view showing the state when solidification is almost complete.

As shown in FIG. 5(a), solidification of the molten resin 116 starts on the surface at which the resin contacts the low-temperature preform mold 1e, whereby the solidified film 117 (+marks indicated by a solid line) is formed.

Since the volume of the protrusion 33 is very small as compared with the volume of the preform 10e, the amount of shrinkage V is assumed to be the same as that of the preform 10 of the first embodiment. Therefore, the moving distance in this embodiment is substantially the same as that in the first embodiment, i.e. $\Delta_1$. In addition, this embodiment is advantageous since the amount of an excessive solidified film 117 is decreased.

As the solidification progresses, as mentioned above, part of the solidified film 117 which is formed on the surface which contacts the preform mold 1e becomes a (hard) solidified film 117' which is further solidified (+marks indicated by a thick line). Inside the solidified film 117 and the solidified film 117', a new (soft) solidified film 118 (+marks indicated by a dotted line) is partially formed. These solidified films 117' and 118 are also formed on the sliding surface 23 of the mouth neck part mold 2 which contacts the molten resin 116. If the above-mentioned solidification progresses, the molten resin 116 shrinks to reduce the volume. Therefore, it is required to absorb the amount of shrinkage. That is, as shown in FIG. 5(b), the body part mold 3e (cylindrical protrusion part 31e) moves upwardly in a distance of $\Delta_1$ according to the amount of shrinkage of the resin material.

When the cylindrical protrusion part 31e moves upwardly, the solidified film 117' and the solidified film 118, which are formed on the sliding surface 23, are peeled off from the sliding surface 23 by a sharp tip portion of the protrusion 33. The direction of movement of the solidified film 117' and the solidified film 118 which have been peeled off are controlled by the protrusion 33. As a result, the solidified film 117' or the solidified film 118 which have been peeled off move onto the solidified film 117' and the solidified film 118 which are formed on the inner surface of the protrusion 33 and the upper surface of the cylindrical protrusion part 31e (in the direction indicated by an arrow), and is then stacked in a region below the outer peripheral side of the neck ring 115 (a region in the vicinity of the inner surface of the protrusion 33 and in the vicinity of the lower surface on the outer peripheral side of the cylindrical protrusion part 31e). Inside the thus stacked solidified film 117', the solidified film 118 (or a further new solidified film) is formed. That is, the solidified film 117' and the solidified 118 are formed in a state in which they are gathered in the lower part on the outer peripheral side of the neck ring 115.

In this way, since a region where the solidified film 117' and the solidified film 118 are gathered, which are formed on the sliding surface 23, is away from a root or the like of the neck ring 115 (a region which is important for mechanical strength), lowering in mechanical strength of the preform 10e can be prevented without fail.

As mentioned above, according to the preform molding apparatus of this embodiment, it is possible to gather, in the lower part on the outer peripheral part of the neck ring 115, the solidified film 117' and the solidified film 118, which are formed when the molten resin material is solidified and shrunk. That is, the protrusion 33 peels the solidified film 117' and the solidified film 118 which are formed on the sliding surface 23, and controls the moving direction of the solidified film 117' and the solidified film 118 which have been peeled. This protrusion 33 effectively prevents the solidified film 117' from intruding into the molten resin 116 as shown in FIG. 12b. As a result, since no boundary surface with a poor mechanical strength is formed between the solidified film 117' and the solidified film 118, which have been gathered, and the molten resin 116 which will be solidified, lowering in mechanical strength of the preform 10e can be prevented.

In addition, since the mechanical strength does not lower even if the speed of solidification of the molten resin 116 is increased, productivity can be improved. In addition, since there is no need to increase the amount of a resin material to reinforce the boundary surface with a poor mechanical strength, the amount of the resin material can be decreased. In addition, degrading of appearance due to the presence of the above-mentioned boundary surface (reflected light by the boundary surface) can be prevented.

As mentioned above, the preform 10e of this embodiment, the solidified film 117' and the solidified film 118, which are formed on the sliding surface 23, are gathered in the lower part (the outer peripheral side of the lower part) of the neck ring 115. This preform 10e can prevent lowering in mechanical strength caused by the above-mentioned boundary surface 119. Therefore, it is possible to improve productivity or to decrease the amount of a resin material. In addition, degrading of appearance due to the presence of the above-mentioned boundary surface (reflected light by the boundary surface) can be prevented.

In addition, by conducting blow molding, a bottle (not shown) formed from the preform 10e of this embodiment can have the same effects as those attained by the preform 10e.

In the above-mentioned embodiment, the inner surface of the protrusion 33 of the body part mold 3e is an arc-shaped curved surface of about 90°. The configuration is, however, not limited thereto. For example, instead of this curved surface, an inner surface having one or two or more inclined surfaces may be used. Further, as shown in FIG. 6, at least one of a step, a concave part and a convex part may be provided on the upper surface of the protrusion 33 or the cylindrical protrusion part 31e.

Then, the examples thereof will be explained with reference to the drawings.

FIFTH EXAMPLE

Figure 6:
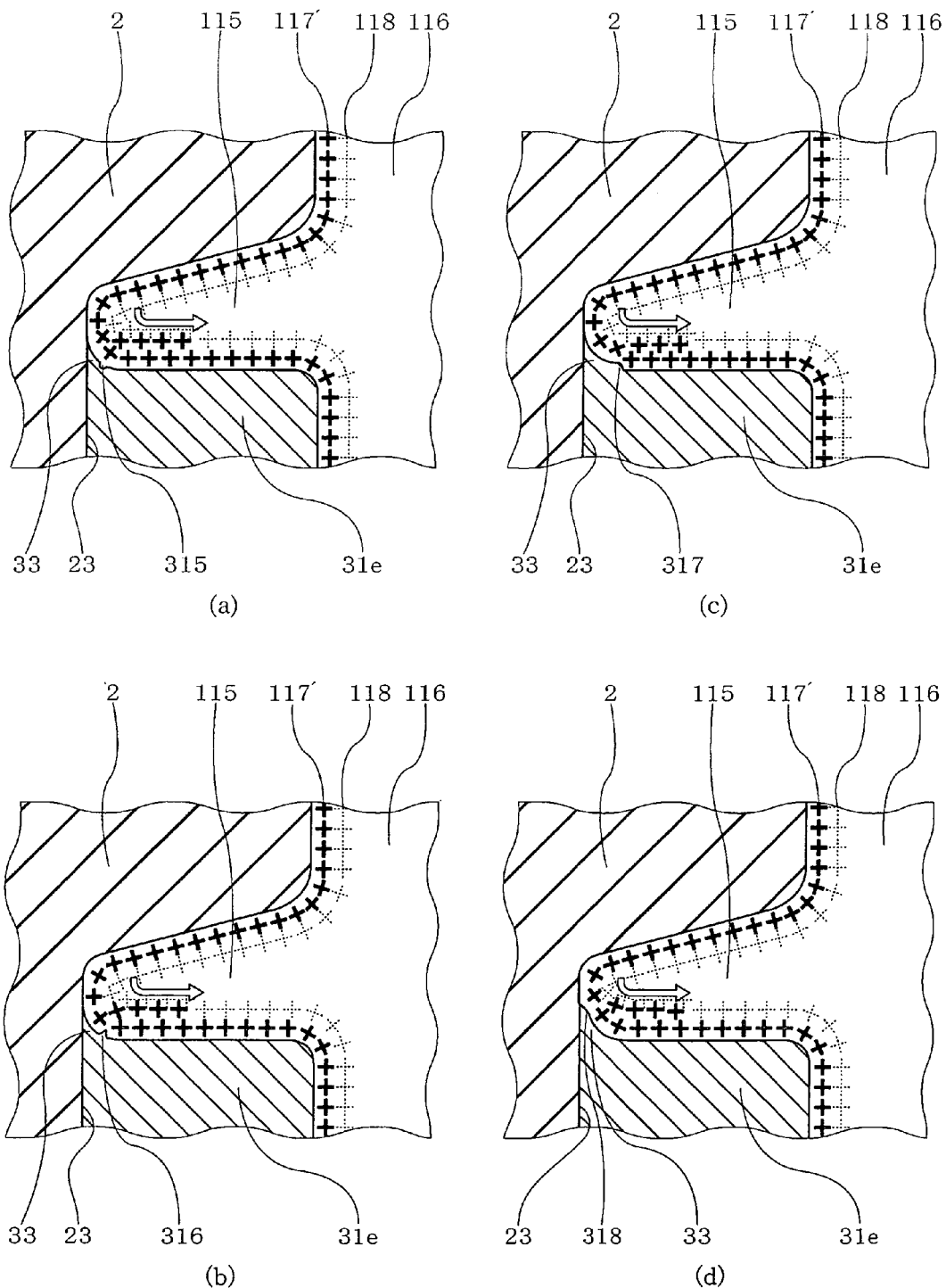
FIG. 6 is a schematic cross-sectional view of essential parts for explaining the preform mold used in the preform molding apparatus and the solidification state of the preform according to each example of the second embodiment of the present invention.

FIG. 6 is a schematic cross-sectional view of essential parts for explaining the preform mold used in the preform molding apparatus and the solidification state of the preform according to each example of the second embodiment of the present invention.

The preform mold 1e of Fifth Example shown in FIG. 6(a) has an annular concave part 315 on the inner surface of the protrusion 33. This concave part 315 has a semicircular cross section.

In this preform mold 1e, solidification of the molten resin 116 which is in contact with the concave part 315 starts earlier than solidification of the molten resin 116 which surrounds the above-mentioned molten resin 116 which is in contact with the concave part 315. Therefore, when the cylindrical protrusion part 31e moves upwardly, the solidified film 117' and the solidified film 118 which have been peeled off from the sliding surface 23 move along the inner surface of the protrusion 33, and is placed over the solidified film 117' or the solidified film 118, which is formed on the concave part 315. Then, the solidified film 117' or the solidified film 118 which has been peeled off move onto the solidified film 117' and the solidified film 118 which are formed on the upper surface of the cylindrical protrusion part 31e (in the direction indicated by an arrow), and are stacked thereon. That is, the solidified film 117' and the solidified film 118 which have been peeled from the sliding surface 23 can be gathered without fail in the lower part on the outer peripheral side of the neck ring 115.

The preform 10e and the bottle of Fifth Example can avoid a disadvantage that the mechanical strength of the neck ring 115 is lowered. In addition, an annular protrusion part is formed by the concave part 315 on the lower surface of the neck ring 115.

SIXTH EXAMPLE

The preform mold 1e of Sixth Example shown in FIG. 6(b) has, on the inner surface of the protrusion 33, an annular convex part 316 which protrudes upwardly. This convex part 316 has an almost triangle cross section.

In this preform mold 1e, when the cylindrical protrusion part 31e moves upwardly, the solidified film 117' and the solidified film 118 which have been peeled off from the sliding surface 23 move along the inner surface of the protrusion 33. Then, by the convex part 316, they move in an upward direction, and are placed over the solidified film 117' or the solidified film 118, which are formed on the cylindrical projection 31e. Then, the solidified film 117' and the solidified film 118 which have been peeled off move onto the solidified film 117' and the solidified film 118 which are formed on the upper surface of the cylindrical protrusion part 31e (in the direction indicated by an arrow), and are stacked thereon. That is, the solidified film 117' and the solidified film 118 which have been peeled from the sliding surface 23 can be gathered without fail in the lower part on the outer peripheral side of the neck ring 115.

The preform 10e and the bottle of Sixth Example can avoid a disadvantage that the mechanical strength of the neck ring 115 is lowered. In addition, an annular recess is formed by the convex part 316 on the lower surface of the neck ring 115.

The shape of the cross section of the above-mentioned convex part 316 is not limited to the above-mentioned shape. For example, it may be a shape that the solidified film 117' and the solidified film 118 which have been peeled off from the sliding surface 23 are introduced onto the solidified film 117' and the solidified film 118 which are formed on the upper surface of the cylindrical protrusion part 31e.

Although not shown, by changing the shape or height of the convex part 316, the solidified film 117' and the solidified film 118 which have been peeled may be moved toward almost right above as in the first embodiment, or they may be gathered in a swirl.

SEVENTH EXAMPLE

The preform mold 1e of Seventh Example shown in FIG. 6(c) has an annular step 317 on the inner peripheral side of the projection 33. This step 317 is formed above the upper surface of the cylindrical protrusion part 31e, and has an inclined surface which rises from the upper surface of the cylindrical protrusion part 31e to the outer peripheral direction.

In this preform mold 1e, when the cylindrical protrusion part 31e moves upwardly, the solidified film 117' and the solidified film 118 which have been peeled off from the sliding surface 23 move along the inner surface of the protrusion 33, and are placed over the solidified film 117' and the solidified film 118, which are formed on the cylindrical projection part 31e. Then, the solidified film 117' and the solidified film 118 which have been peeled off move onto the solidified film 117' and the solidified film 118 which are formed on the upper surface of the cylindrical protrusion part 31e (in the direction indicated by an arrow), and are stacked thereon. That is, the solidified film 117' and the solidified film 118, which have been peeled from the sliding surface 23, can be gathered without fail in the lower part on the outer peripheral side of the neck ring 115.

The preform 10e and the bottle of Seventh Example can avoid a disadvantage that the mechanical strength of the neck ring 115 is lowered. In addition, an annular recess is formed by the step 317 on the lower surface of the neck ring 115.

EIGHTH EXAMPLE

In the preform mold 1e of Eighth Example shown in FIG. 6(d), the inner surface of the upper part of the protrusion 33 is an annular inclined surface 318. This inclined surface 318 is one which rises at an angle of about 45° towards the outer peripheral direction.

The angle is not limited to about 45°. For example, it may be an angle that the solidified film 117' and the solidified film 118 which have been peeled off from the sliding surface 23 are introduced onto the solidified film 117' and the solidified film 118 which are formed on the curved surface of the protrusion 33 or the upper surface of the cylindrical protrusion part 31e.

In this preform mold 1e, when the cylindrical protrusion part 31e moves upwardly, the solidified film 117' and the solidified film 118 which have been peeled off from the sliding surface 23 move inwardly by the inclined surface 318, and then are stacked on the solidified film 117' and the solidified film 118 formed on the curved surface of the protrusion 33. Then, the solidified film 117' and the solidified film 118 which have been peeled off move onto the solidified film 117' and the solidified film 118 which are formed on the curved surface of the protrusion part 33 and the upper surface of the cylindrical protrusion part 31e (in the direction indicated by an arrow), and are stacked thereon. That is, the solidified film 117' and the solidified film 118 which have been peeled from the sliding surface 23 can be gathered without fail in the lower part on the outer peripheral side of the neck ring 115.

The preform 10e and the bottle of Eighth Example can avoid a disadvantage that the mechanical strength of the neck ring 115 is lowered. In addition, an annular recess is formed by the inclined surface 318 or the protrusion 33 on the side surface of the neck ring 115.

NINTH EXAMPLE

Figure 7:
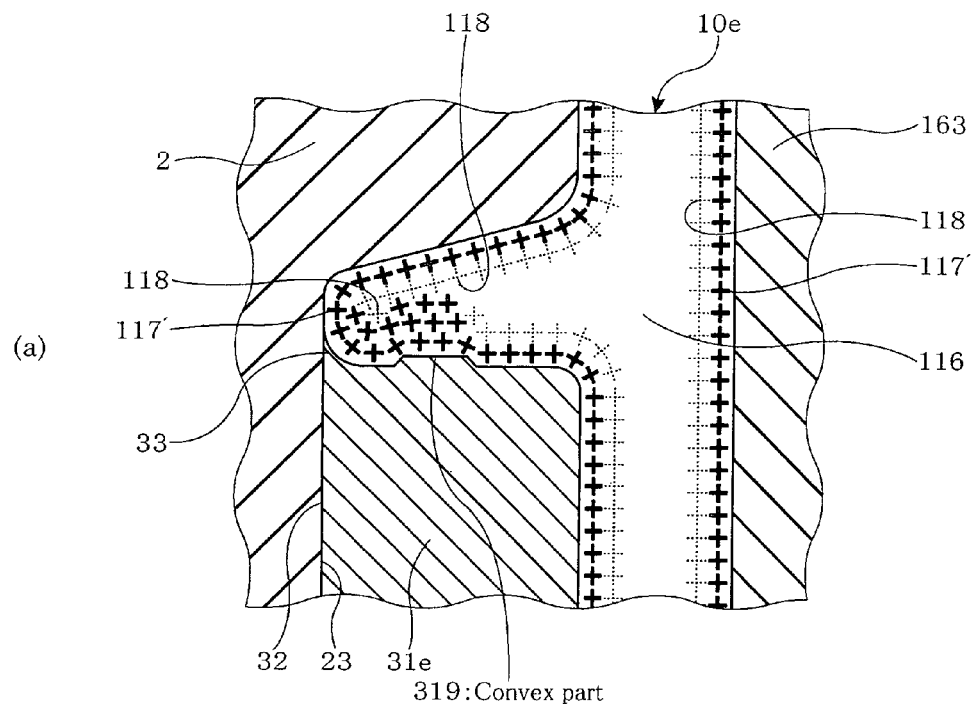
FIG. 7 is a schematic enlarged view of essential parts for explaining the preform mold used in the preform molding apparatus and the solidification state of the preform according to each example of the second embodiment of the present invention, in which (a) is a cross-sectional view; (b) is a plan view of the cylindrical protrusion part; and (c) is a cross-sectional view taken along line A-A.
Figure 7:
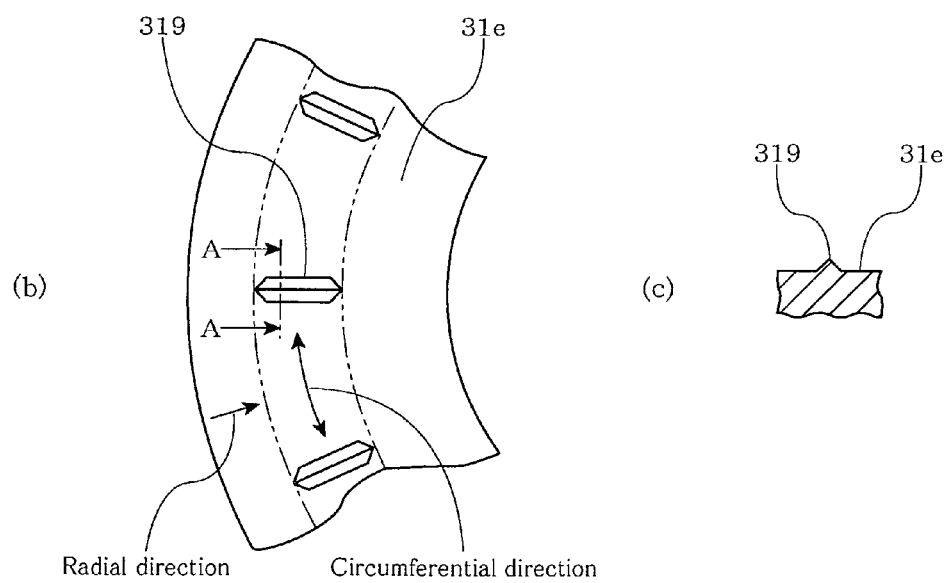

FIG. 7 is a schematic enlarged view of essential parts for explaining the preform mold used in the preform molding apparatus and the solidification state of the preform according to each example of the second embodiment of the present invention, in which (a) is a cross-sectional view; and (b) is a plan view of the cylindrical protrusion part.

In FIG. 7, in the preform mold 1e of Ninth Example, on a plurality of positions of the outer peripheral side of the flat upper surface of the cylindrical protrusion part 31e, linear convex parts 319 are formed. The plurality of convex parts 319 are provided radially (at a predetermined interval in a circumferential direction) relative to the center of the upper surface of the cylindrical protrusion part 31e. The cross section thereof in the circumferential direction is triangle. The other configurations are substantially the same as those in the second embodiment.

The arrangement, length, shape and the like of the convex part 319 are not limited to those in the above-mentioned example. For example, the convex parts 319 may be provided such that they are arranged continuously in the circumferential direction. It is also possible to increase the length of the convex part 319 in a radial direction. The shape of the cross section of the convex part 319 may be trapezoidal, semicircular or angular shape with a curved surface or the like.

In this preform mold 1e, when the cylindrical protrusion part 31e moves upwardly, the solidified film 117' and the solidified film 118 which have been peeled off from the sliding surface 23, move along the inner surface of the protrusion 33 in the radial direction, and move onto the solidified film 117' and the solidified film 118, which are formed on the upper surface of cylindrical protrusion part 31e.

At this time, the solidified film 117' and the solidified film 118 which have been peeled off are pressed in the circumferential direction as they move in the radial direction. The solidified film 117' and the solidified film 118 which have moved in the radial direction are released from the above-mentioned circumferentially-directed pressure when part of them moves such that it climbs up the convex part 319. The solidified film 117' and the solidified film 118 which have moved in the radial direction are gathered in such a manner that it is folded in the radial direction in the vicinity of the convex part 319 by the convex part 319. Therefore, the solidified film 117' or the solidified film 118 which has moved in the radial direction then move smoothly (in a state where they are released from the circumferentially-directed pressure) on the solidified film 117' and the solidified film 118 formed on the upper surface of the cylindrical protrusion part 31e, and are stacked thereon.

That is, the solidified film 117' and the solidified film 118 which have been peeled from the sliding surface 23 can be gathered in the radial direction and in the circumferential direction without fail in the lower part on the outer peripheral side of the neck ring 115.

The preform 10e and the bottle of Ninth Example can avoid a disadvantage that the mechanical strength is lowered. In addition, an annular recess is formed by the convex parts 319 on the lower surface of the neck ring 115.

The protrusion 33 of this embodiment is formed in an annular shape. The shape of the protrusion 33 is not limited thereto. Although not shown, a plurality of arc-shaped protrusions 33 may be provided at a predetermined interval. Also in this configuration, the solidified film 117' and the solidified film 118 which have been peeled off can be moved smoothly (in a state where they are released from the circumferentially-directed pressure).

TENTH EXAMPLE

Figure 8:
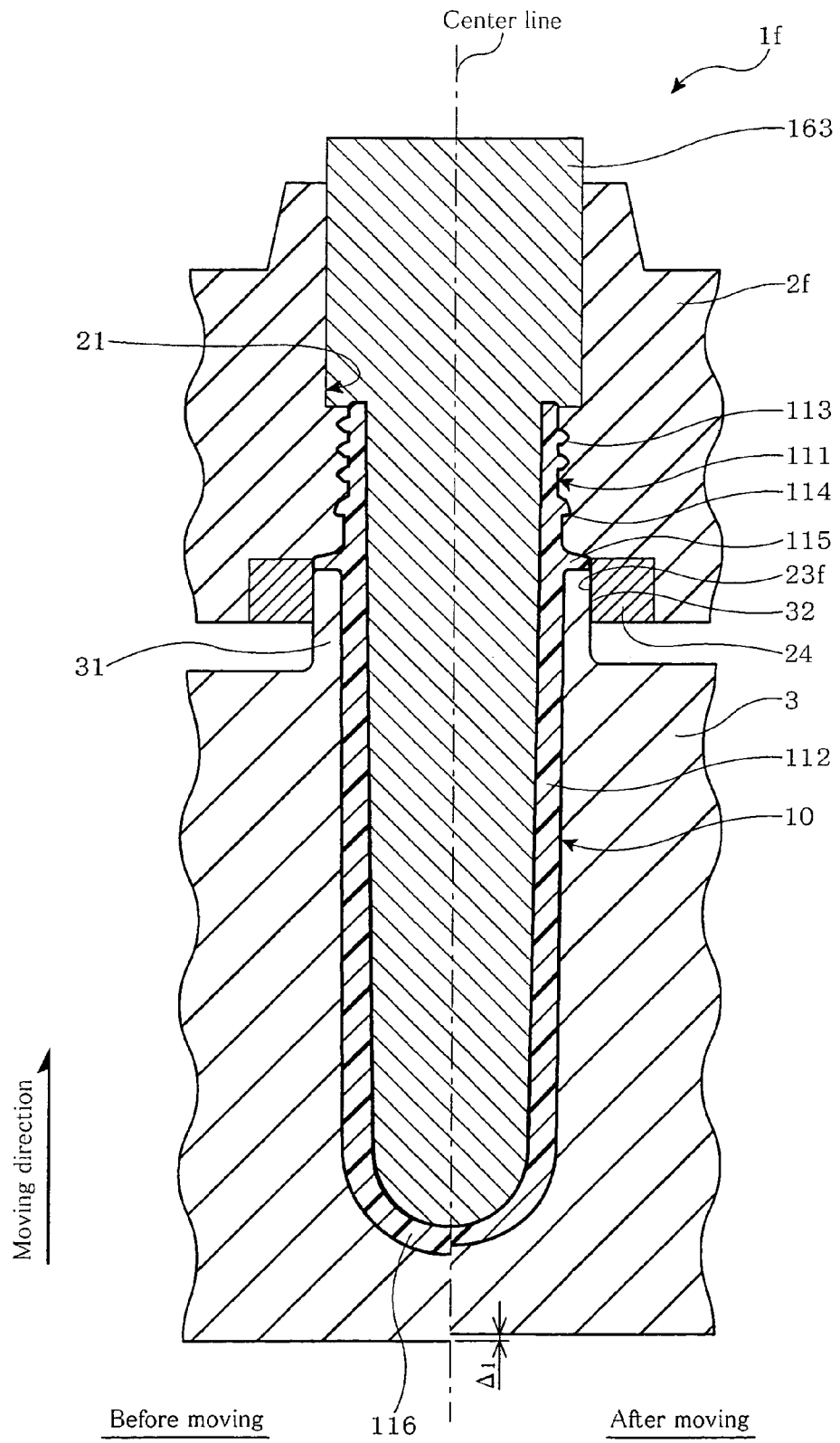
FIG. 8 is a schematic cross-sectional view for explaining a preform mold used in the preform molding apparatus according to the example of the second embodiment of the present invention.
Figure 9:
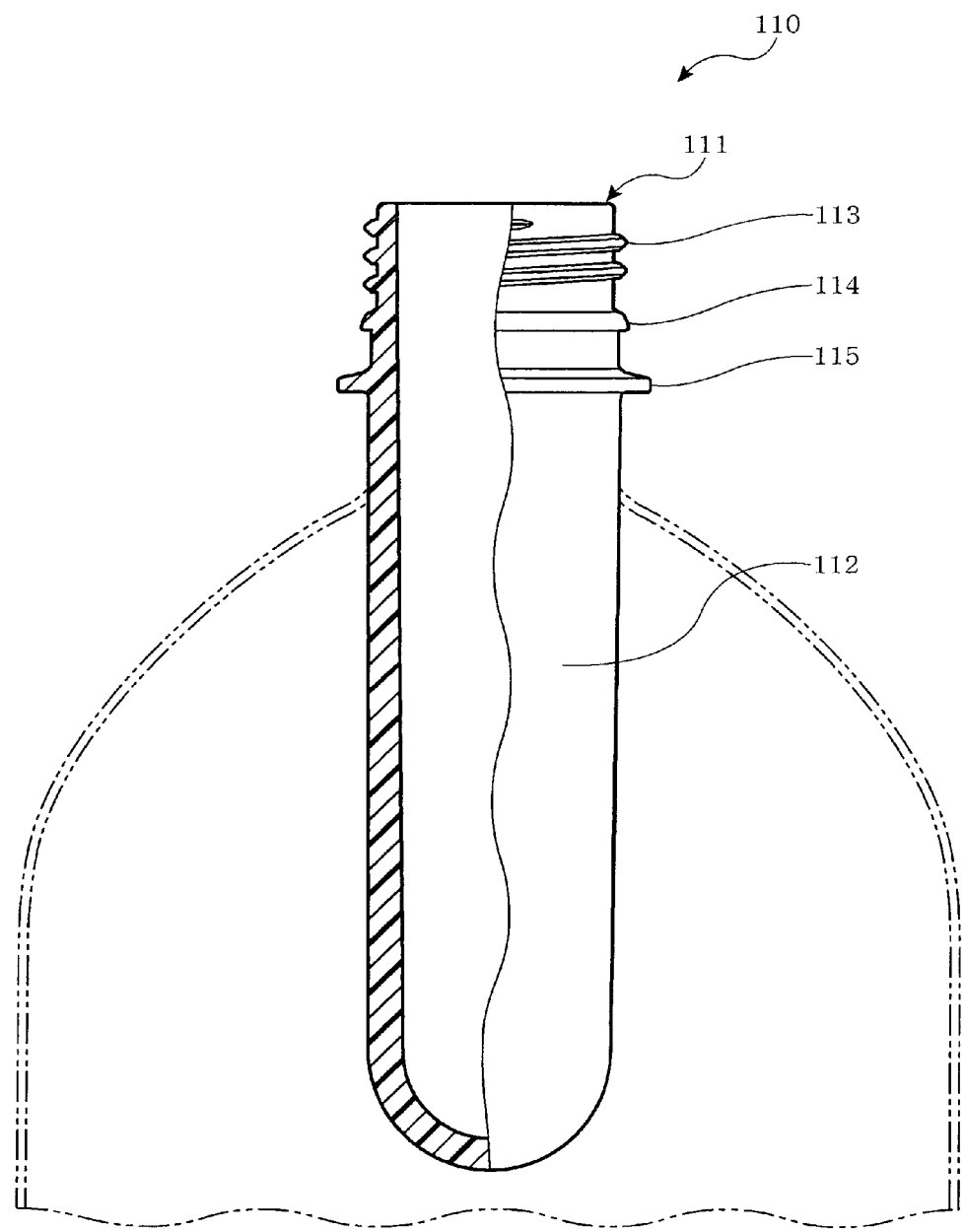
FIG. 9 is a schematic side view of the preform relating to the present invention.

FIG. 8 is a schematic cross-sectional view for explaining a preform mold used in the preform molding apparatus according to the example of the second embodiment of the present invention.

In FIG. 8, a preform mold 1f differs from the preform mold 1e of the second embodiment in that it has a sliding surface 23f made of a ceramic ring 24 instead of the sliding face 23 made of a metal. The other configurations are almost the same as those of the preform mold 1e of the second embodiment.

This ceramic ring 24 is secured to a mouth neck part mold 2f with a bolt, an adhesive or the like. In addition, the ceramic ring 24 has heat insulating properties which are superior to that of the metallic material constituting the mouth neck part mold 2. Therefore, the preform mold 1f can control the forming speed of the like of the solidified film 117 and the solidified film 118 on the sliding surface 23f.

As mentioned above, according to the preform mold 1f in this example, not only the moving direction or the like of the solidified film 117 and the solidified film 118 can be controlled but also the conditions for forming the solidified film 117 and the solidified film 118 can be controlled, and hence, reliability and productivity can be further improved.

The preform, the bottle and the preform molding apparatus are explained hereinabove with reference to preferred embodiments. The preform, the bottle and the preform molding apparatus of the present invention are not limited to those in the above-mentioned embodiments, and it is needless to say that various modifications are possible within the scope of the present invention.

For example, there are no particular restrictions on the configuration of moving each mold of the preform mold, and various configurations or mechanisms can be used.

INDUSTRIAL APPLICABILITY

The preform and the preform molding apparatus of the present invention can be applied as the preform and the preform molding apparatus of various plastic containers.

The invention claimed is:

1. A preform molding apparatus for forming a preform having a neck ring, a mouth neck part and a body part, comprising:
   a preform mold comprising:
   a mouth neck part mold having a first section for molding an outer surface of the mouth neck part, a second section for molding an upper surface and an outer-vertical surface of the neck ring, and a first sliding surface extending linearly downwardly from a portion of the second section defining the outer-vertical surface,
   a body part mold having a third section for molding an outer surface of the body part, a fourth section for molding an entire lower surface of the neck ring, and a second sliding surface extending linearly downwardly from an outer edge of the fourth section and slidably contacting with the first sliding surface, and
   a core mold for molding an inner surface of the preform,
   wherein when a molten resin material is solidified and shrunk, the mouth neck part mold and the body part mold move relative to each other according to an amount of shrinkage of the molten resin material while sliding at the first and second sliding surfaces to thereby mold the neck ring.

2. The preform mold apparatus according to claim 1, wherein at least one of the mouth neck part mold and the body part mold has at least one of a step, a concave part and a convex part at a position corresponding to the neck ring.

3. The preform molding apparatus according to claim 1, wherein at least one of the mouth neck part mold and the body part mold has a protrusion of which the outer surface constitutes a part of the sliding surface and of which the inner surface contains at least one of an inclined surface and a curved surface.

4. The preform molding apparatus according to claim 3, wherein at least one of the mouth neck part mold and the body part mold has at least one of a step, a concave part and a convex part in the protrusion.

5. The preform molding apparatus according to claim 1, wherein at least one of the mouth neck part mold and the body part mold is provided with at least one of a step, a concave part and a convex part extending in the radial direction of the neck ring.

6. The preform molding apparatus according to claim 1, wherein at least one of the mount neck part mold and the body part mold, which is formed of an insulating material, and which has a contact surface contacting the molten resin material.

* * * * *